United States Patent
Daoud

(10) Patent No.: US 6,351,591 B1
(45) Date of Patent: Feb. 26, 2002

(54) FIBER OPTIC BUFFER TUBE STORAGE DEVICE WITH INTEGRATED BEND LIMITER FEATURE

(75) Inventor: Bassel Hage Daoud, Morris County, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/364,290

(22) Filed: Jul. 30, 1999

(51) Int. Cl.[7] .................................................. G02B 6/00
(52) U.S. Cl. ...................................... 385/135; 385/134
(58) Field of Search ................................ 385/134, 135, 385/136, 137; 379/325–330; 242/388.9, 570, 159, 430, 118, 129, 135, 136, 137

(56) References Cited

U.S. PATENT DOCUMENTS

| | | | | |
|---|---|---|---|---|
| 4,702,551 A | * | 10/1987 | Coulombe | ................. 350/96.2 |
| 4,722,585 A | * | 2/1988 | Boyer | ........................ 350/96.2 |
| 5,071,211 A | * | 12/1991 | Debortoli et al. | ............. 385/76 |
| 5,544,273 A | * | 8/1996 | Harrison | ..................... 385/135 |

* cited by examiner

Primary Examiner—Brian Healy
Assistant Examiner—Omar Rojas, Jr.

(57) ABSTRACT

A fiber optic buffer tube storage device with an integrated bend limiter includes a support with a housing. The housing includes a first end mounted on the support and a distal end projecting outwardly therefrom. The housing has an outer surface for retaining a fiber optical cable and an inner area disposed within the housing for storing buffer tubes during nonuse. Tabs are provided that project substantially orthogonally outwardly from the distal end of the housing for retaining fiber optical cable on the outer surface of the housing. Tabs are also provided that project substantially orthogonally inwardly from the distal end of the housing for retaining buffer tubes within the housing during nonuse.

17 Claims, 2 Drawing Sheets

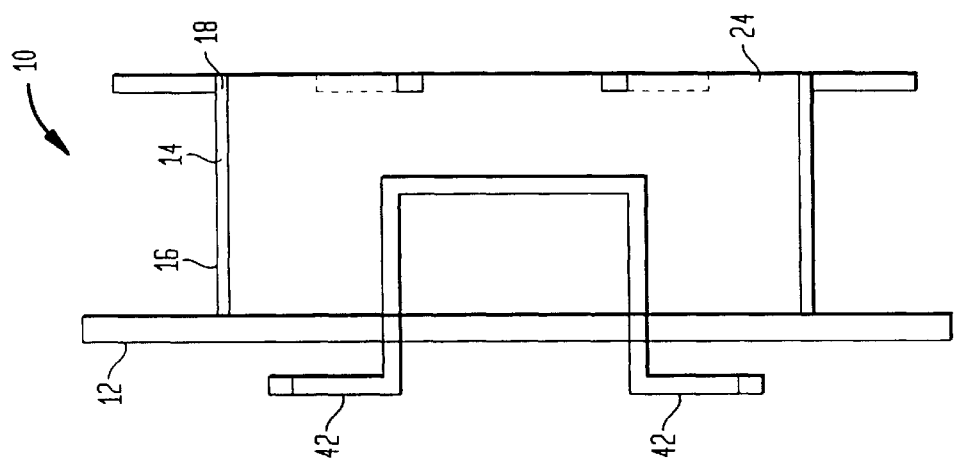
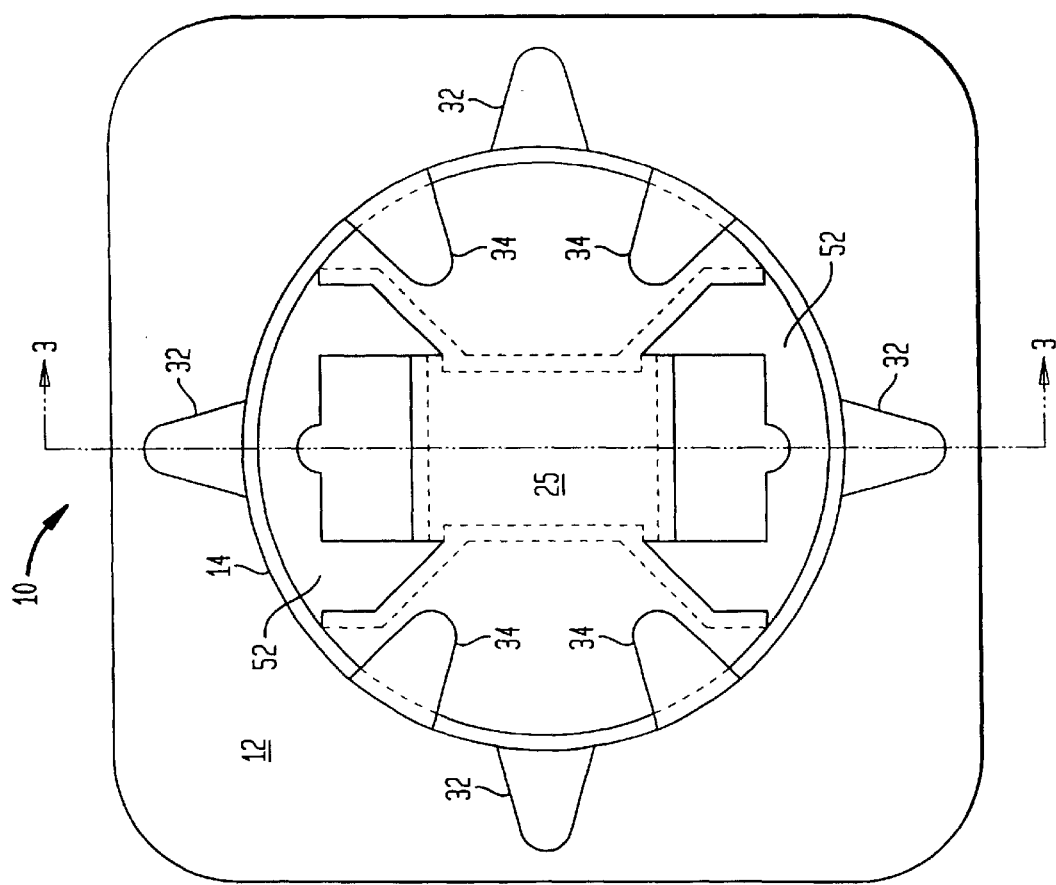

FIBER OPTIC BUFFER TUBE STORAGE DEVICE WITH INTEGRATED BEND LIMITER FEATURE

BACKGROUND OF THE INVENTION

1. Field of the Invention

A fiber optic buffer tube storage device with an integrated bend limiter for mounting fiber optical cable on an outer surface of a housing while enabling storage of buffer tubes within an inner area of the housing.

2. Description of Background Art

Once a fiber cable enters a fiber closure, the jacket disposed around the fiber cable is normally removed and the individual fibers are exposed. This is needed to prepare the fibers for termination or splicing. Flexible buffer tubes are then inserted onto the fiber cables to prevent the fiber cables from inadvertent breakage. Some fibers, that are to be terminated at a later date, are normally placed within storage trays with no buffer tube protection. Buffer tubes, that are to be used at a later date, are also placed within the same storage trays. This causes entanglement between the buffer tubes and the fibers. Separation between the buffer tubes and the fibers is required to minimize the possible damage to the fibers.

SUMMARY AND OBJECTS OF THE INVENTION

It is an object of the present invention to provide both a fiber optic buffer tube storage device together with an integrated bend limiter.

Another object of the present invention is to provide a fiber optic buffer tube storage device with an integrated bend limiter wherein tabs are provided for retaining fiber optical cable on an outer surface of a housing.

A further object of the present invention is to provide a fiber optic buffer tube storage device with an integrated bend limiter wherein tabs are provided for retaining buffer tubes within the housing during nonuse. The tabs prevent the buffer tubes from being accidentally removed from the housing.

These and other objects of the present invention are achieved by providing a fiber optic buffer tube storage device with an integrated bend limiter including a support with a housing. The housing includes a first end mounted on the support and a distal end projecting outwardly therefrom. The housing has an outer surface for retaining a fiber optical cable and an inner area disposed within the housing for storing buffer tubes during nonuse. Tabs are provided that project substantially orthogonally outwardly from the distal end of the housing for retaining fiber optical cable on the outer surface of the housing. Tabs are also provided that project substantially orthogonally inwardly from the distal end of the housing for retaining buffer tubes within the housing during nonuse.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a top plan view of the fiber optic buffer tube storage device with an integrated bend limiter as illustrated in FIG. 1; and FIG. 3 is a cross-sectional view of the fiber optic buffer tube storage device with an integrated bend limiter taken along line 3—3 as illustrated in FIG. 2.

DETAILED DESCRIPTION OF THE PREFERRED EMBODIMENTS

Figure 1:
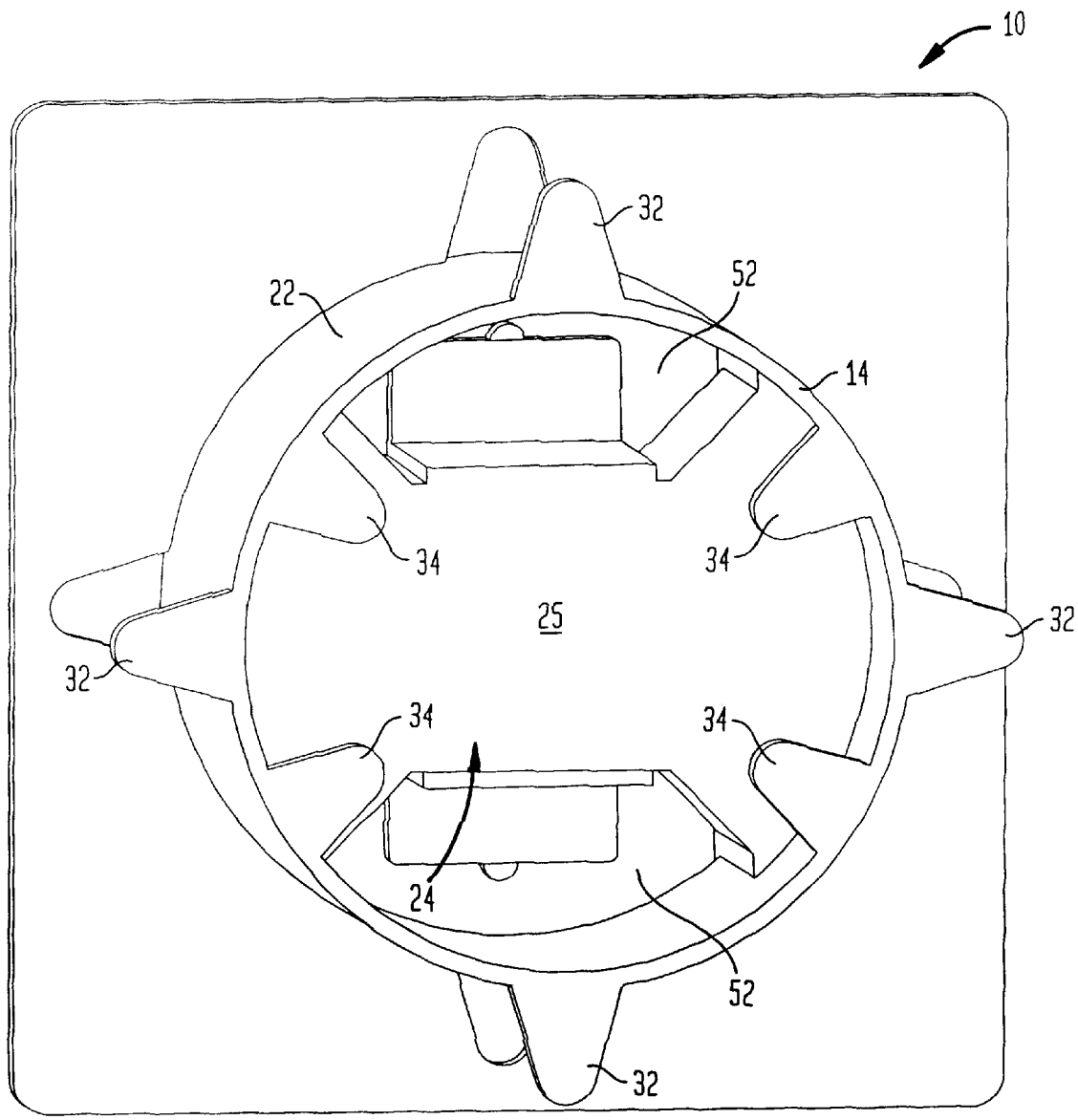
FIG. 1 is a perspective view illustrating a fiber optic buffer tube storage device with an integrated bend limiter.

As illustrated in FIGS. 1–3, a fiber optic buffer tube storage device with an integrated bend limiter 10 is provided that includes a support 12 having a housing 14 projecting therefrom. The housing 14 includes a first end 16 mounted on the support 12 and a distal end 18 projecting outwardly therefrom. The housing 14 has an outer surface 22 for retaining a fiber optical cable mounted thereon. The housing 14 can be drum shaped with a circular outer surface 22 that provides a minimum bend radius for the fiber optical cable adapted to be mounted on the outer surface 22. The minimum bend radius ensures that light will be properly transmitted through the fiber optical cable stored on the housing 14.

Tabs 32 are provided that project substantially orthogonally outwardly from the distal end 18 of the housing 14 for retaining fiber optical cable on the outer surface 22 of the housing 14. As illustrated in FIGS. 1–3, four tabs 32 may be provided for retaining the fiber optical cable on the outer surface 22. However, additional tabs or few than four tabs 32 are contemplated within the scope of the present invention.

The housing 14 includes an inner area 24 disposed within the housing 14. The housing 14 includes an interior wall 25 extending within the inner area 24 for forming an area adapted for storing buffer tubes during nonuse. Tabs 34 are provided that project substantially orthogonally inwardly from the distal end 18 of the housing 14 for retaining buffer tubes within the housing 14 during nonuse. As illustrated in FIGS. 1–3, four tabs 34 may be provided for retaining the buffer tubes within the housing 14 during nonuse. However, additional tabs or few than four tabs 34 are contemplated within the scope of the present invention.

A connector 42 extends from a rear side of the support 12 and is adapted for securing said support to a junction box during use. As illustrated in FIGS. 1 and 2, a space 52 is provided within the interior portion of the housing 14 for permitting the connector 42 to be pinched for manually releasing the connector 42 from a junction box. The connector 42 is normally in an engaging position for securing the support 12 to a junction box and is selectively biased for disengaging the support from a junction box.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fiber optic buffer tube storage device with an integrated bend limiter comprising:

a support;

a housing including a first end mounted on said support and a distal end projecting outwardly therefrom, said housing having an outer surface adapted for retaining a fiber optical cable and an inner area disposed within said housing for storing buffer tubes during nonuse;

said housing projecting a predetermined first distance from said support for providing an unobstructed area for retaining a fiber optical cable on the outer surface thereof;

an interior wall provided within said housing for defining said inner area of said housing, said interior wall forming a surface for displacing the inner area a predetermined second distance from said support for providing an unobstructed area for storing buffer tubes therein; said predetermined second distance being less than said predetermined first distance for forming an enlarged area for retaining a fiber optical cable on the outer surface of said housing relative to said inner area for storing buffer tubes during nonuse, wherein said outer surface of said housing is circular in cross section; and a connector mounted on said support and being biased for engagement with an aperture in a junction box and adapted for securing said support to a function box during use.

2. The fiber optic buffer tube storage device with an integrated bend limiter according to claim 1, and further including tabs projecting substantially orthogonally outwardly from the distal end of said housing and being adapted for retaining fiber optical cable on the outer surface of said housing.

3. The fiber optic buffer tube storage device with an integrated bend limiter according to claim 1, and further including tabs projecting substantially orthogonally inwardly from the distal end of said housing and being adapted for retaining buffer tubes within said housing during nonuse.

4. The fiber optic buffer tube storage device with an integrated bend limiter according to claim 1, wherein said outer surface provides a minimum bend radius for fiber optical cable mounted thereon.

5. The fiber optic buffer tube storage device with an integrated bend limiter according to claim 1, wherein said connector projects rearwardly from said interior wall.

6. The fiber optic buffer tube storage device with an integrated bend limiter according to claim 5, wherein said connector is normally in an engaging position and adapted for securing said support to a junction box and selectively biased for disengaging said support from a junction box.

7. The fiber optic buffer tube storage device with an integrated bend limiter according to claim 2, wherein four tabs project substantially orthogonally outwardly from the distal end of said housing.

8. The fiber optic buffer tube storage device with an integrated bend limiter according to claim 3, wherein four tabs project substantially orthogonally inwardly from the distal end of said housing.

9. A fiber optic buffer tube storage device with an integrated bend limiter comprising:

a support adapted for mounting within a fiber optical junction box, said support including a front side and a rear side;

a housing including a first end mounted on said front side of said support and a distal end projecting outwardly therefrom, said housing having an outer surface adapted for retaining a fiber optical cable and an inner area disposed within said housing for storing buffer tubes during nonuse;

said housing projecting a predetermined first distance from said support for rproviding an unobstructed area for retaining a fiber optical cable on the outer surface thereof;

an interior wall provided within said housing for defining said inner area of said housing, said interior wall forming a surface for displacing the inner area a predetermined second distance from said support for providing an unobstructed area for storing buffer tubes therein; said predetermined second distance being less than said predetermined first distance for forming an enlarged area for retaining a fiber optical cable on the outer surface of said housing relative to said inner area for storing buffer tubes during nonuse; and a connector extending from said rear side of said support and being adapted to engage with an aperture in a junction box to secure said support to a junction box during use.

10. The fiber optic buffer tube storage device with an integrated bend limiter according to claim 9, and further including tabs projecting substantially orthogonally outwardly from the distal end of said housing and being adapted for retaining fiber optical cable on the outer surface of said housing.

11. The fiber optic buffer tube storage device with an integrated bend limiter according to claim 9, and further including tabs projecting substantially orthogonally inwardly from the distal end of said housing and being adapted for retaining buffer tubes within said housing during nonuse.

12. The fiber optic buffer tube storage device with an integrated bend limiter according to claim 9, wherein said outer surface of said housing is circular in cross section and projects from said support said predetermined first distance for permitting a predetermined length of fiber optical cable to be mounted on the outer surface thereof.

13. The fiber optic buffer tube storage device with an integrated bend limiter according to claim 9, wherein said outer surface provides a minimum bend radius for fiber optical cable mounted thereon.

14. The fiber optic buffer tube storage device with an integrated bend limiter according to claim 9, wherein said connector projects rearwardly from said interior wall.

15. The fiber optic buffer tube storage device with an integrated bend limiter according to claim 14, wherein said connector is normally in an engaging position and adapted for securing said support to a junction box and selectively biased for disengaging said support from a junction box.

16. The fiber optic buffer tube storage device with an integrated bend limiter according to claim 10, wherein four tabs project substantially orthogonally outwardly from the distal end of said housing.

17. The fiber optic buffer tube storage device with an integrated bend limiter according to claim 11, wherein four tabs project substantially orthogonally inwardly from the distal end of said housing.

* * * * *